United States Patent
Mackenzie

(10) Patent No.: US 11,238,739 B2
(45) Date of Patent: Feb. 1, 2022

(54) METHOD AND APPARATUS TO PREVENT VRU ACCIDENTS

(71) Applicant: HYUNDAI MOBIS Co., Ltd., Seoul (KR)

(72) Inventor: Douglas Mackenzie, Plymouth, MI (US)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 16/872,325

(22) Filed: May 11, 2020

(65) Prior Publication Data
US 2021/0350703 A1 Nov. 11, 2021

(51) Int. Cl.
| G08G 1/16 | (2006.01) |
|---|---|
| G06K 9/00 | (2006.01) |
| G06T 7/70 | (2017.01) |
| B60Q 9/00 | (2006.01) |

(52) U.S. Cl.
CPC ......... *G08G 1/166* (2013.01); *G06K 9/00335* (2013.01); *G06K 9/00597* (2013.01); *G06K 9/00791* (2013.01); *G06K 9/00845* (2013.01); *G06T 7/70* (2017.01); *B60Q 9/008* (2013.01); *G06T 2207/30201* (2013.01); *G06T 2207/30236* (2013.01); *G06T 2207/30252* (2013.01); *G06T 2207/30268* (2013.01)

(58) Field of Classification Search
CPC ........... B60H 1/00742; B60R 25/1004; B60W 50/14; B60W 2040/0818; B60W 40/08; B60K 28/06
See application file for complete search history.

(56) References Cited

U.S. PATENT DOCUMENTS

| 10,328,851 | B2 | 6/2019 | You et al. | |
|---|---|---|---|---|
| 10,343,605 | B1 | 7/2019 | Fields et al. | |
| 2005/0045392 | A1* | 3/2005 | Maslov | H02K 1/141 |
| | | | | 180/65.51 |
| 2016/0318445 | A1* | 11/2016 | Sugimoto | B60W 60/0027 |
| 2018/0086339 | A1* | 3/2018 | Hanna | G06K 9/00604 |
| 2018/0162271 | A1 | 6/2018 | Kim | |
| 2018/0174460 | A1 | 6/2018 | Jung et al. | |
| 2019/0376798 | A1* | 12/2019 | Abramson | G01C 21/3415 |

FOREIGN PATENT DOCUMENTS

| KR | 10-2018-0135033 | 12/2018 |
|---|---|---|
| KR | 10-2018-0154796 | 12/2018 |
| WO | 20170181818 | 10/2017 |

* cited by examiner

*Primary Examiner* — Mirza F Alam
(74) *Attorney, Agent, or Firm* — H.C. Park & Associates, PLC

(57) ABSTRACT

An apparatus configured to prevent at least one vulnerable road user (VRU) from having an accident including a driver monitoring unit configured to utilize at least one sensor provided in a vehicle to detect a gaze area corresponding to a gaze direction of a driver of the vehicle, a VRU monitoring unit configured to calculate position information including current position and predicted motion information of the VRU existing in a peripheral area of the vehicle, the VRU is detected by using the at least one sensor, a detection unit configured to detect whether the driver is aware of the VRU and whether the VRU is aware of the driver based on a gaze area of the driver and the position information of the VRU, and a warning processing unit configured to output warning information on a dangerous situation to some or all of the driver and the VRU in response to a detection result of the detection unit.

20 Claims, 5 Drawing Sheets

METHOD AND APPARATUS TO PREVENT VRU ACCIDENTS

BACKGROUND

Field

Exemplary embodiments relate to an apparatus and a method of preventing a vulnerable road user (VRU) from having an accident. More specifically, the present disclosure relates to a VRU accident prevention method and apparatus for use with a vehicle to detect and warn a risk of collision with a VRU when the vehicle stops at a bus stop, intersection, or other stopping point.

Discussion of the Background

The statements in this section merely provide background information related to the present disclosure and do not necessarily constitute prior art.

An increasing number of vehicles in the world are one cause for more vehicle accidents, which results in an ever-increasing number of automobile-related deaths.

The causes of vehicle accidents are various, such as speeding, signal violations, drunk driving, drowsy driving, and inattention of the driver. The need for a technology that can prevent accidents stemming from those and other causes has emerged. An alarm device has been developed to alert and inform the driver of dangerous situations while driving.

Even with such alarm devices provided, pedestrians, cyclists, light-weight vehicle occupants, and motor-cyclists may not recognize the approach of the vehicle, while its driver may not recognize the possibility of a collision or accident. In this case, the vehicle may be configured to prevent a collision with a pedestrian through sudden braking, which may cause a rear-end collision with another vehicle nearby or a trailing vehicle.

Therefore, there is a need for a technology capable of actively preventing a collision or accident by providing warning information of a dangerous situation including situations where VRU and vehicles do not see each other.

The above information disclosed in this Background section is only for enhancement of understanding of the background of the invention and, therefore, it may contain information that does not constitute prior art.

SUMMARY

Exemplary embodiments of the present invention provide an apparatus configured to prevent at least one vulnerable road user (VRU) from having an accident, which includes a driver monitoring unit configured to utilize at least one sensor provided in a vehicle to detect a gaze area corresponding to a gaze direction of a driver of the vehicle, a VRU monitoring unit configured to calculate position information including current position and predicted motion information of the VRU existing in a peripheral area of the vehicle, the VRU is detected by using the at least one sensor, a detection unit configured to detect whether the driver is aware of the VRU and whether the VRU is aware of the driver based on a gaze area of the driver and the position information of the VRU, and a warning processing unit configured to output warning information on a dangerous situation to some or all of the driver and the VRU in response to a detection result of the detection unit.

In addition, according to another aspect, the present disclosure provides a method of preventing at least on vulnerable road user (VRU) from having an accident, which includes utilizing at least one sensor provided in a vehicle to detect a gaze area corresponding to a gaze direction of a driver of the vehicle, calculating position information including current position and predicted motion information of the VRU existing in a peripheral area of the vehicle, the VRU is detected by using the sensor, detecting whether the driver is aware of the VRU and whether the VRU is aware of the driver based on a gaze area of the driver and the position information of the VRU, and outputting warning information on a dangerous situation to some or all of the driver and the VRU in response to a detection result of the detecting.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATIVE EMBODIMENTS

Figure 1:
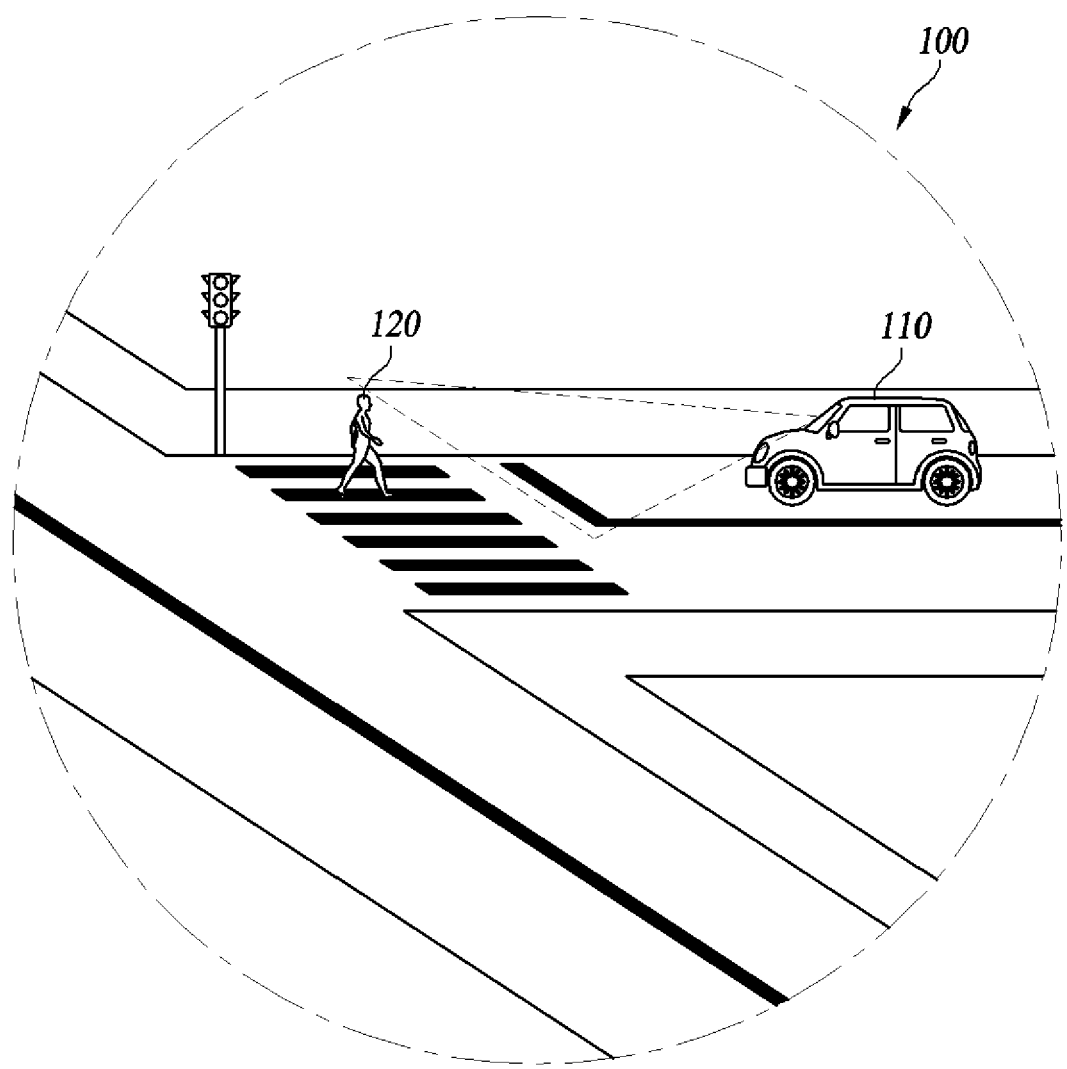
FIG. 1 is a view illustrating an example traffic environment to which a VRU accident prevention method is applied according to at least one embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

The present disclosure in at least one embodiment seeks to provide a vulnerable road user (VRU) accident prevention method and apparatus which can actively prevent a collision or accident in situations where the VRU and a vehicle or driver of a vehicle do not recognize or see each other. The method may perform these actions by checking whether the VRU is aware of the vehicle or whether the driver is aware of the VRU at the same time and provide warning information regarding the dangerous situation.

Various terms such as first, second, A, B, (a), (b), etc., may be used solely for the purpose of differentiating one component from the other but not to imply or suggest the substances, the order or sequence of the components.

Throughout this specification, when a part "includes" or "comprises" a component, the part is meant to further include other components, not excluding thereof unless there is a particular description contrary thereto. The terms such as "unit," "module," and the like refer to units configured to process at least one function or operation, which may be implemented by hardware, software, or a combination thereof.

FIG. 1 is a view illustrating an example traffic environment 100 to which a VRU accident prevention method may be applied according to at least one embodiment of the present disclosure.

A growing number of drivers and vehicles are encountering situations where vehicle collisions occur. One aspect of an increased number of vehicle collisions is monetary damages that result from damage to vehicles and injuries to people. Accidents are particularly tragic when vehicles collide with VRUs, and a large number of VRUs die as a result.

Recently introduced vehicles 110 (e.g., electric vehicles, hybrid cars, etc.) may use relatively quiet electric motors compared to vehicles that use conventional engines. Therefore VRUs 120 such as pedestrians, cyclists, light-weight vehicle occupants, motor-cyclists, and other vehicles are often unaware of the approach of those vehicles 110. Exemplary embodiments described herein may be configured to work with automobiles and other vehicles having relatively quiet motors, such as electric motors.

Therefore, to prepare for dangerous situations that can occur during operation of the vehicle, exemplary embodiments described herein include safety devices configured to automatically control movement of the vehicle, as well as include alarm devices configured to alert drivers of potential hazards and inform the driver of dangerous situations.

However, despite the provision of an alarm on the driver side, pedestrians, cyclists, light-weight vehicle occupants, and motor-cyclists may not be aware of the approach of the vehicle, and the driver may also not be aware of the possibility of a collision.

At least one embodiment the present disclosure provides a VRU accident prevention method to be implemented to generate warning information about a dangerous situation to securely alert the driver who may not see or be aware of one or more VRUs or one or more VRUs who fail to recognize a vehicle. Exemplary embodiments may furnish the driver with warning information about a dangerous situation in order to aggressively prevent possible collisions or accidents between vehicles and VRUs.

A VRU accident prevention method according to exemplary embodiments may be implemented through an in-vehicle driver assistance system, for example, including a VRU accident prevention apparatus and method of accident prevention.

Specifically, a VRU accident prevention apparatus according to exemplary embodiments is linked with various sensors and control modules provided in a vehicle to determine whether a VRU recognizes the vehicle and whether at the same time the driver recognizes the VRU. The system thereby provides warning information to a driver and a VRU about a dangerous situation.

Further, the VRU accident prevention apparatus considers whether there is a collision risk predicted by using factors such as vehicle movement, VRU position, and whether the VRU and the vehicle or driver have mutual awareness to be given warning information, resulting in a more effective warning and driving situations.

Figure 2:
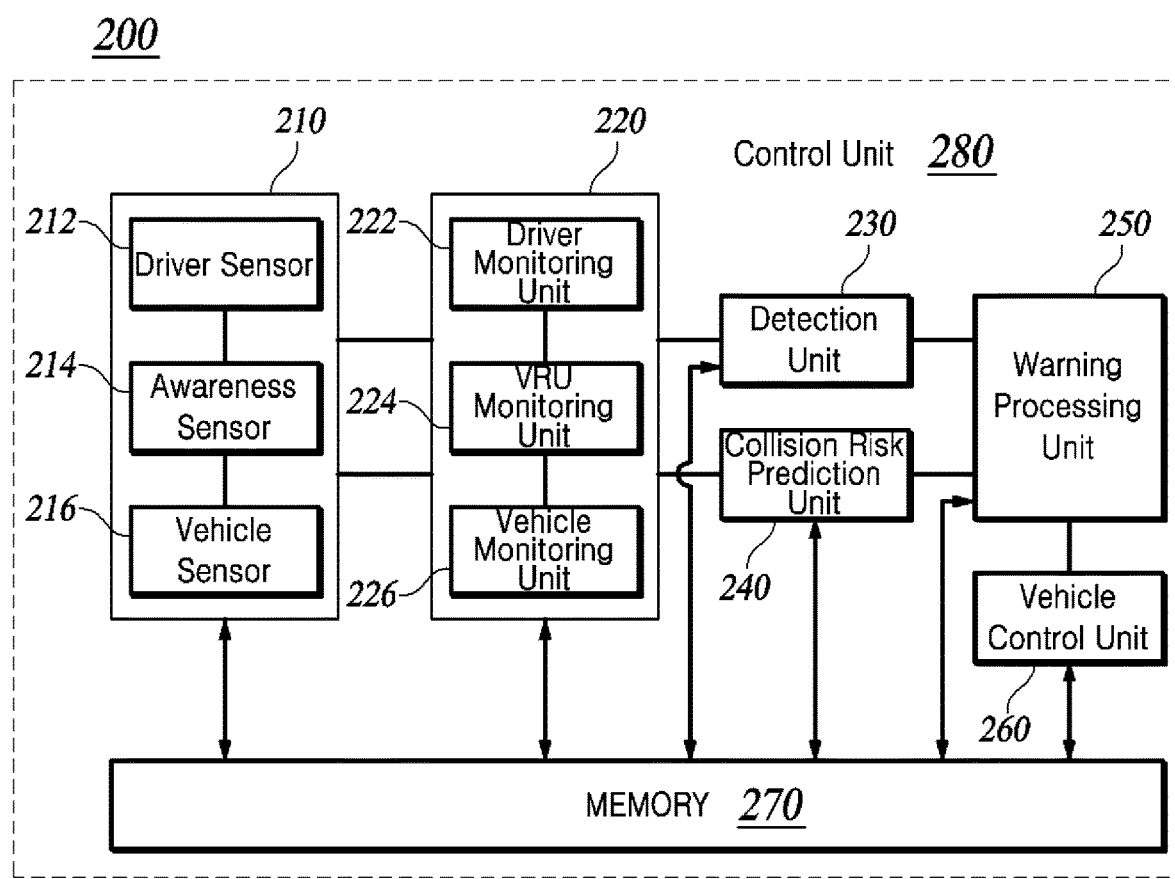
FIG. 2 is a schematic block diagram illustrating a VRU accident prevention apparatus according to at least one embodiment of the present disclosure.

FIG. 2 is a schematic block diagram illustrating a VRU accident prevention apparatus according to at least one embodiment of the present disclosure.

As illustrated in FIG. 2, the VRU accident prevention apparatus 200 according to exemplary embodiments includes structural and performance devices including a sensor unit 210, a monitoring unit 220, a detection unit 230, a collision risk prediction unit 240, a warning processing unit 250, a vehicle control unit 260, and a memory module 270. Structural and performance characteristics of the VRU accident prevention apparatus 200 may be implemented in a control unit 280 of the VRU accident prevention apparatus 200. The control unit 280 may include a memory module 270 to interface with each of the elements of the VRU accident prevention apparatus. Devices of the VRU accident prevention apparatus 200 may be located external to the controller when desirable for design or other considerations. Here, the components included in the VRU accident prevention apparatus 200 are not necessarily limited to the illustrated ones.

As illustrated in FIG. 2, the sensor unit 210 having at least one sensor component is configured to detect a driver occupying a vehicle and the external environment of the vehicle. The sensor unit 210 is integrated with the VRU accident prevention apparatus 200. In alternative embodiments the sensor unit 210 may be implemented as a separate apparatus associated with the VRU accident prevention apparatus 200. The VRU accident prevention apparatus 200 may be implemented to receive sensing information obtained by the at least one sensor in the sensor unit 210 or the sensing result determined based on the sensor information.

The sensor unit 210 is provided with at least one or more sensors configured to detect the driver in the vehicle and the external environment of the vehicle, and the sensor unit 210 uses the sensors to perform a function of collecting information used to prevent VRU accidents.

In some embodiments, the sensor unit 210 includes all or some of a driver sensor 212, an awareness sensor 214, and a vehicle sensor 216. Embodiments of the present disclosure do not limit the sensors included in the sensor unit 210 to a specific type.

The driver sensor 212 is configured to perform a function of collecting information related to the driver in the vehicle.

In some embodiments, the driver sensor 212 is configured to capture a driver's face image of the driver. Here, the driver's face image may refer to a front surface image of the driver's head having eyes, a nose, and a mouth, etc. The driver's face image may particularly include an image of the driver's eyes.

The driver sensor 212 may be a camera configured to photograph a face image of the driver, or may be an image collection device linked with the camera. For example, the driver sensor 212 may be installed in front of the driver's seat such as on a dashboard or other driver-facing structure inside the vehicle to photograph the driver, and thereby obtain the driver's face image.

In another embodiment, the driver sensor 212 may be implemented by a three-dimensional camera or an infrared camera, to obtain a three-dimensional face image or an infrared face image of the driver.

The awareness sensor 214 is configured to perform a function of detecting various kinds of information about an external environment around the vehicle 110.

In some embodiments, the awareness sensor 214 is implemented with at least one sensor of one or more cameras, LiDAR (light detection and ranging) sensors, infrared sensors. For example, when implemented as a camera, the awareness sensor 214 may collect an extra-vehicle object image by photographing external objects existing in a peripheral area of the vehicle.

When implemented as a LiDAR sensor, the awareness sensor 214 emits light having a laser wavelength to the outside of the vehicle 210 and measures the time it takes for the emitted light to be reflected by an external object back to the starting point and thereby generates the external object information (LiDAR data).

In some embodiments, the awareness sensor 214 may detect the vulnerable road users (VRU) presence in a peripheral area of the vehicle 110, but embodiments are not necessarily limited thereto. For example, the awareness sensor 214 may detect an external object, particularly a moving object, in the peripheral area of the vehicle, which may possibly collide with the vehicle.

The vehicle sensor 216 is configured to perform a function of determining the present operational state of the vehicle by interworking and interfacing with various devices in the vehicle.

The vehicle sensor 216 may receive various data and determine vehicle state information, including the movement of the vehicle and driver control inputs. The vehicle state information may be implemented as prediction data to predict future movement of the vehicle. The vehicle sensor 216 may be linked with a local electronic control unit (ECU) that is configured to perform consolidated control over various controllers in the vehicle to collect the vehicle state information.

One or more sensors in the sensor unit 210 may interact with GPS or navigation satellites to receive locating information about the vehicle 110 and information about potential hazards surrounding the vehicle. This information may be combined with sensor data to provide additional information that can be used to alert the driver, vehicle, or surrounding VRUs about a potential accident or collision.

The sensor unit 210 may also be configured to interact with other traffic monitoring devices such as traffic cameras mounted on municipal infrastructure, building cameras, vehicle mobile apps that collect traffic data, VRU monitoring data, and the like.

Data from the sensor unit 210 may be stored in the memory module 270, retrieved from the memory module 270, and used by other component parts of the detection unit 280.

The monitoring unit 220 performs a function of monitoring the state of the vehicle, the driver and the VRU around the vehicle based on the information collected by using the various sensors in the sensor unit 210.

In some embodiments, the monitoring unit 220 includes a driver monitoring unit 222, a VRU monitoring unit 224, and a vehicle monitoring unit 226.

The driver monitoring unit 222 is linked with the driver sensor 212 and monitors the state of the driver.

In some embodiments, the driver monitoring unit 222 detects a gaze area corresponding to the driver's gaze direction based on the driver's face image collected by using the driver sensor 212.

The following describes an exemplary method performed by the driver monitoring unit 222 according to some embodiments to detect a gaze area corresponding to the driver's gaze direction.

The driver monitoring unit 222 may determine the eye region and a head pose corresponding to the direction of the driver's face from the driver's face image provided by using the driver sensor 212, and the driver monitoring unit 222 may be configured to detect the driver's gaze area based on the determined eye region and head pose.

The driver monitoring unit 222 may obtain the position of the pupil from the eye image detected from the driver's face image and detect the driver's gaze based on the obtained pupil.

The driver monitoring unit 222 estimates a head pose corresponding to the direction in which the driver's face is directed by calculating various distance differences based on a plurality of landmark points detected from the driver's face image, for example, a nose landmark and a chin landmark. Depending on which direction a driver's head is facing, the distances between different facial landmarks will be different. Using data stored in memory module 270, the driver monitoring unit 222 may compare the different facial landmark distances and determine which direction a driver is pointing their head at a given time.

The driver monitoring unit 222 may detect the gaze area depending on the driver's gaze. The gaze area may be a detected image from the vehicle that corresponds to a predetermined viewing angle or angles stored in the memory module 270 based on the driver's gaze.

In addition, the driver monitoring unit 222 may detect the gaze area by calculating a position vector extending from the driver's seat of the vehicle to the position at which the driver is looking. The driver monitoring unit 222 may also interface with data collected from external measuring devices such as GPS and locally mounted cameras that can detect images of a driver's head direction at a given moment.

The VRU monitoring unit 224 is linked with the awareness sensor 214 of the sensor unit 210 to monitor the state of VRUs.

In some embodiments, the VRU monitoring unit 224 utilizes a variety of sensors including the awareness sensor 214 to calculate position information including the current position and predicted motion information of a VRU present in the peripheral area of the vehicle.

The VRU monitoring unit 224 calculates a position vector for the current position of the VRU and estimates predicted motion information including whether there is a movement of the VRU, estimated movement information, and estimated standstill information.

For example, the VRU monitoring unit 224 may calculate, as predicted motion information, a position vector for a future position of the VRU, an estimated time to reach a future position, and the like. Aspects of the VRU monitoring unit 224 and awareness sensor 214, and other aspects discussed herein, may be implemented in software and hardware developed for the detection unit 280.

On the other hand, the VRU monitoring unit 224 may calculate the future position of a VRU and the estimated time to reach a position based on VRU-related sensing information such as VRU posture, gaze direction, speed, and the like.

The vehicle monitoring unit 226 is linked with the vehicle sensor 216 to monitor the state of the vehicle.

In some embodiments, the vehicle monitoring unit 226 is configured to predict future movement of the vehicle based on the movement of the vehicle and the driver control input which are detected by using the vehicle sensor 216. For example, the vehicle monitoring unit 226 may predict the future movement of the vehicle based on the vehicle heading direction and the operation information of the steering wheel, the gear, the brake, and the like. Future movement may also be factored using external data sources such as GPS, traffic cameras, building cameras, and the like.

The detection unit 230 is configured to perform a function of detecting whether the driver is aware of the VRU and the VRU is aware of the vehicle based on the monitoring results of the driver monitoring unit 222 and the VRU monitoring unit 224.

Figure 3:
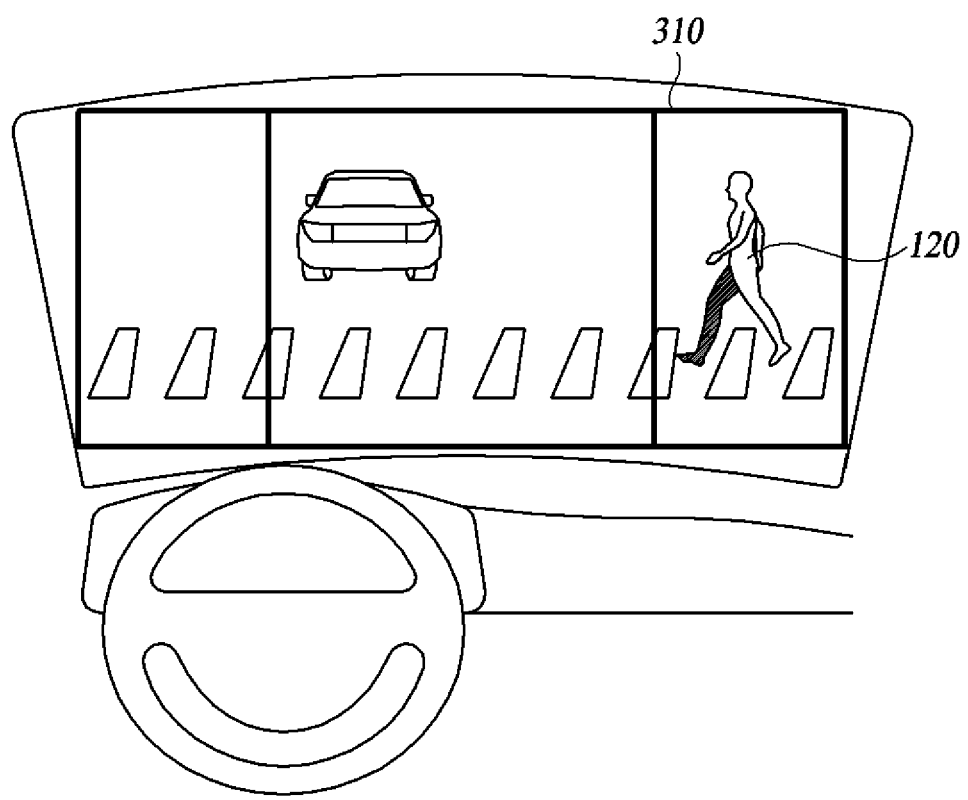
FIG. 3 is an exemplary diagram illustrating a method of detecting whether a driver is aware of VRU according to at least one embodiment of the present disclosure.
Figure 4:
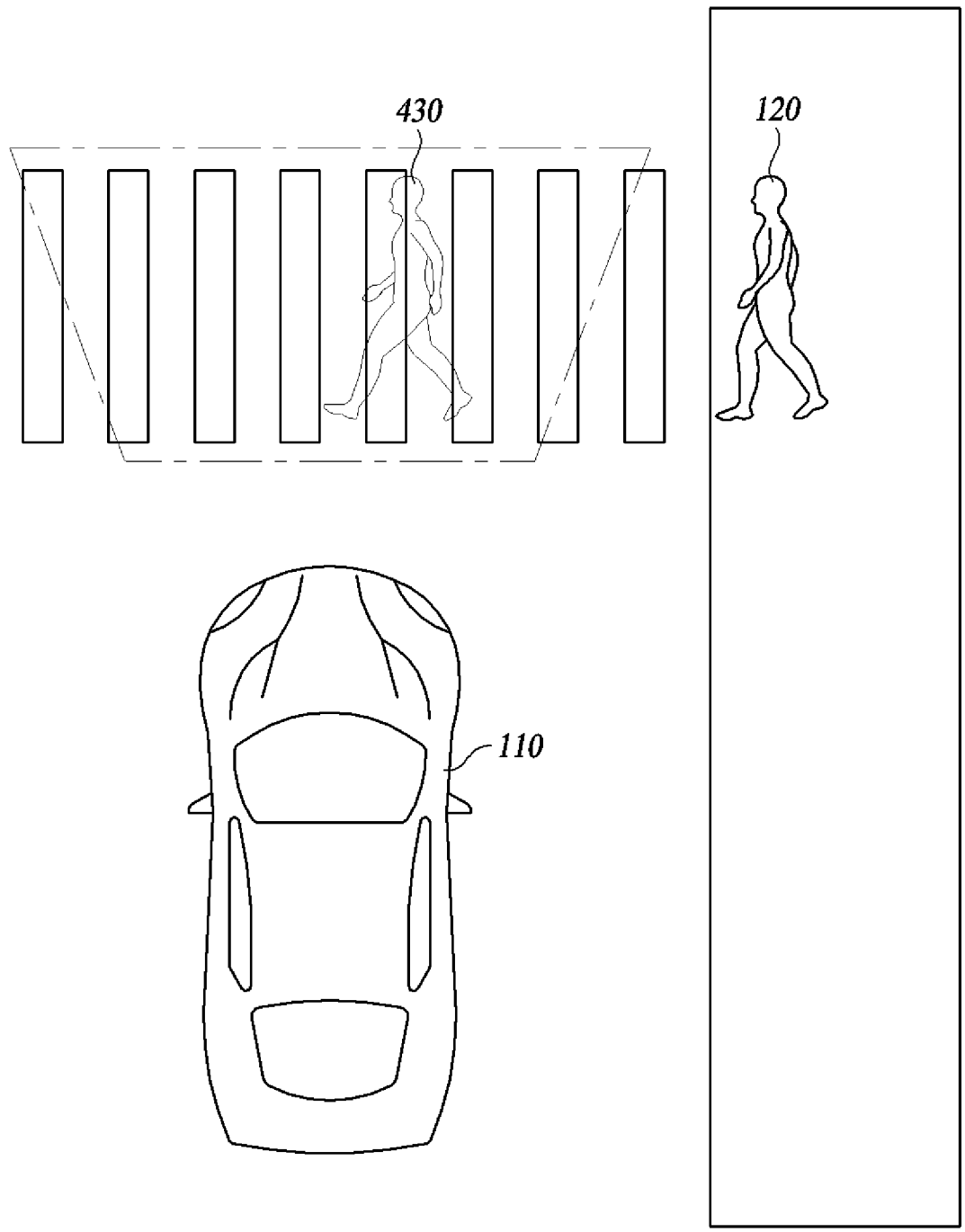
FIG. 4 is an exemplary diagram illustrating a method of detecting whether VRU is aware of a vehicle according to at least one embodiment of the present disclosure.

The following will describe, referring to FIGS. 3 and 4, a method performed by the detection unit 230 configured to detect whether the driver is aware of the VRU and whether the VRU is aware of the vehicle.

FIG. 3 is an exemplary diagram illustrating a driver's gaze area 310 detected by using the driver monitoring unit 222 according to at least one embodiment of the present disclosure.

The detection unit 230 detects whether the driver is aware of a VRU 120 by associating the gaze area 310 provided by the driver monitoring unit 222 with the current position of the VRU 120 calculated by the VRU monitoring 224.

In one example, the detection unit 230 confirms the presence of VRU 120 on the gaze area 310 of FIG. 3 and accordingly determines that the driver is aware of the VRU 120 when the VRU 120 is in the gaze area.

FIG. 4 is an exemplary diagram illustrating VRU predicted motion information calculated by using the VRU monitoring unit 224 according to at least one embodiment of the present disclosure.

The detection unit 230 may predict VRU heading information based on a VRU predicted future position 430 and the estimated time to reach that future position 430. Both the VRU predicted future position 430 and the estimated time to reach the future position may be identified by using the predicted motion information, and it may detect whether the VRU 120 is aware of the vehicle based on the VRU heading information.

For example, the detection unit 230 may associate the future position 430 of the VRU 120 with future movement of the vehicle 110 at a time point when the estimated time has elapsed. Thus the detection unit 230 may determine that the VRU 120 is unaware of the vehicle 110 when the VRU 120 and the vehicle 110 are determined to be present at a same position at a future time point.

Referring to FIG. 2, the collision risk prediction unit 240 determines whether there is a collision risk between the vehicle 110 and the VRU 120 based on the monitoring results of the VRU monitoring unit 224 and the vehicle monitoring unit 226.

In some embodiments, the collision risk prediction unit 240 may determine the risk of collision between the vehicle 110 and the VRU 120 based on the future position of the VRU 120 calculated by using the VRU monitoring unit 224 and the future movement of the vehicle predicted by using the vehicle monitoring unit 226.

In another embodiment, the collision risk prediction unit 240 may determine whether there is a collision risk between the vehicle 110 and the VRU 120 based on the current position of the VRU 120 and the current position of the vehicle 110. The detection unit 230 may be arranged in parallel with the collision risk prediction unit 240. In such an arrangement the detection unit 230 and collision risk prediction unit 240 may simultaneously communicate with the monitoring unit 220. This allows the VRU accident prevention apparatus 200 greater accuracy and responsiveness when detecting a risk. The parallel configuration also allows the detection unit 230 and collision risk prediction unit 240 to communicate relatively simultaneously with the warning processing unit 250. Thus greater information may be made available to the warning processing unit 250 to prevent accidents between vehicles and VRUs.

The warning processing unit 250 outputs warning information of a dangerous situation in response to the detection result of the detection unit 230. Results from the detection unit 230 may be stored in the memory module 270 and accessed by the warning processing unit 250 or other components herein.

For example, in some embodiments, the warning processing unit 250 may be responsive to the detection result of the detection unit 230 to determine that the driver does not pay attention to the VRU while the VRU does not pay attention to the driver, wherein the warning processing unit 250 may output warning information about such a dangerous situation.

In another embodiment, the warning processing unit 250 may output the warning information about the dangerous situation by further utilizing the result of the collision risk determined by the collision risk prediction unit 240.

For example, the warning processing unit 250 may output the warning information by further taking account of the collision risk prediction unit 240. The collision risk prediction unit 240 may determine that there is the VRU at risk of collision with the vehicle, the driver does not pay attention to the VRU, and neither do the VRU in relation to the vehicle.

The warning processing unit 250 may output the warning information to some or all of the driver and the VRU. Indicia that the vehicle 110 may signal to the VRU 120 include audible horn, flashing headlights, other audio from the vehicle 110, among other indicia.

The vehicle control unit 260 may determine that there exists a risk of collision between the driver and the VRU based on the detection result of the detection unit 230 and the prediction result of the collision risk prediction unit 240. Based on the results the vehicle control unit 260 may control a change of movement of the vehicle in order to reduce a collision risk when the vehicle control unit 260 determines that there exists a risk.

For example, the vehicle control unit 260 may control the movement of the vehicle to slow down or make a sudden stop.

Figure 5:
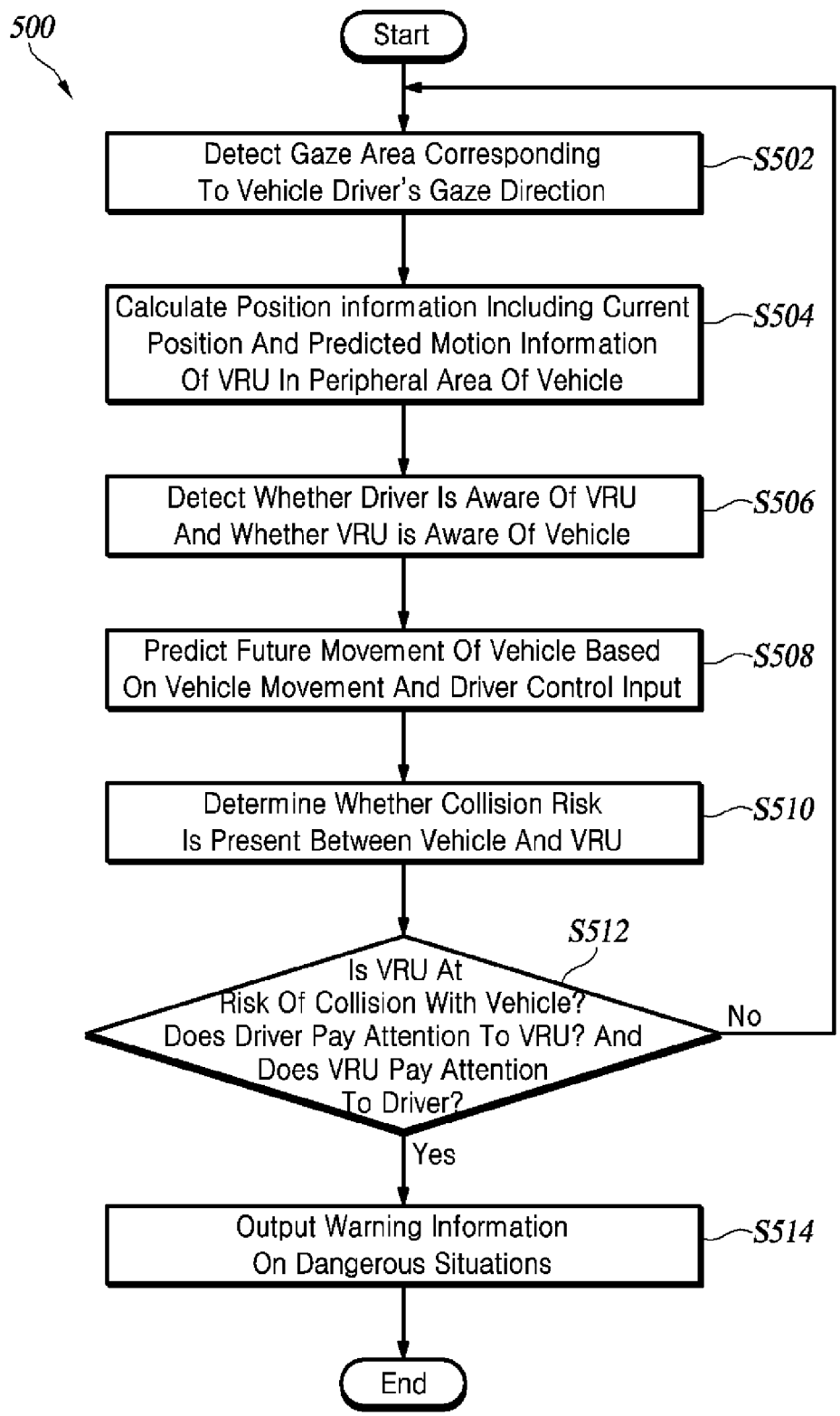
FIG. 5 is a flowchart illustrating a VRU accident prevention method according to at least one embodiment of the present disclosure.

FIG. 5 is a flowchart illustrating a VRU accident prevention method 500 according to at least one embodiment of the present disclosure. For illustrative but not limiting purposes, FIG. 5 illustrates an example case of outputting the warning information in consideration of both the attention/negligence of a driver and the VRU, and the collision risk between the driver and the VRU.

The VRU accident prevention apparatus 200 detects the gaze area corresponding to the driver's gaze direction based on the driver's face image collected by using at least one or more sensors (S502). In Step S502, the VRU accident prevention apparatus 200 may determine, from the driver's face image, an eye area and a head pose corresponding to a direction of the driver's face and detect the driver's gaze area based on the determined eye area and the head pose.

The VRU accident prevention apparatus 200 calculates the position information including the current position and predicted movement information of the VRU existing in the peripheral area of the vehicle by using the information collected with the sensors (S504). In Step S504, the VRU accident prevention apparatus 200 calculates a position vector for the current position of the VRU and estimates predicted motion information including whether there is a movement of the VRU, estimated movement information, and estimated standstill information.

The VRU accident prevention apparatus 200 detects whether the VRU is aware of the driver and whether the vehicle is aware of the VRU based on the gaze area detected in Step S502 and the position information calculated in Step S504 (S506). In Step S506, the VRU accident prevention apparatus 200 detects whether the driver is aware of the VRU by associating the gaze area provided in Step S502 with the current VRU position calculated in Step S504.

The VRU accident prevention apparatus 200 may operate to predict VRU heading information based on the VRU predicted future position and the expected time to reach that future position which is identified by using the predicted motion information predicted in Step S504, and the VRU accident prevention apparatus 200 may detect whether the VRU is aware of the vehicle based on the VRU heading information.

The VRU accident prevention apparatus 200 is configured to predict the future movement of the vehicle based on the vehicle movement and the driver control input collected by using the sensors (S508).

The VRU accident prevention apparatus 200 determines whether a collision risk is present between the vehicle and the VRU by using the future movement of the vehicle obtained in Step S508 (S510). In Step S510, the VRU accident prevention apparatus 200 may determine whether a collision risk is present between the vehicle and the VRU based on the future position of the VRU and the future movement of the vehicle.

The VRU accident prevention apparatus 200 checks whether the vehicle and the VRU pay attention to each other based on whether the vehicle and the VRU have mutual awareness as detected in Step S506. The VRU accident prevention apparatus 200 checks whether a collision risk is present between the vehicle and the VRU according to the determination result of Step S510 (S512).

The VRU accident prevention apparatus 200 outputs warning information in response to Step S512 to determine that there is VRU at risk of collision with the vehicle, the driver does not pay attention to the VRU, and neither does the VRU in relation to the vehicle (S514).

Here, because Steps S502 to S514 corresponds to the operations of the respective components of the VRU accident prevention apparatus 200 described above, further detailed description thereof will be omitted.

As described above, according to some embodiments, the present disclosure is effective in preventing collisions even in a situation where VRU and vehicle do not recognize each other by checking whether the VRU is aware of the vehicle and whether the driver is aware of the VRU at the same time and providing a warning information on the dangerous situation.

Although the steps in FIG. 5 are described to be sequentially performed, they merely instantiate the technical idea of some embodiments of the present disclosure. In other words, a person having ordinary skill in the pertinent art would appreciate that various modifications, additions, and substitutions are possible by changing the sequences described in FIG. 5 or by performing two or more of the steps in parallel, without departing from the gist and the nature of the embodiments of the present disclosure, and hence the steps in FIG. 5 are not limited to the illustrated chronological sequence.

As described above, the VRU accident prevention method 500 of the VRU accident prevention apparatus 200 illustrated in FIG. 5 may be implemented as computer-readable codes on a computer-readable recording medium. The computer-readable recording medium includes any type of recording device on which data can be read by a computer system. Examples of the computer-readable recording medium include a magnetic recording medium (e.g., a ROM, a floppy disk, a hard disk, etc.), an optically readable medium (e.g., a CD-ROM, a DVD, etc.), and the like. Further, the computer-readable recording medium can be distributed in computer systems connected via a network, wherein computer-readable codes can be stored and executed in a distributed manner.

Although exemplary embodiments of the present disclosure have been described for illustrative purposes, those skilled in the art will appreciate that various modifications, additions and substitutions are possible, without departing from the various characteristics of the disclosure. Therefore, exemplary embodiments of the present disclosure have been described for the sake of brevity and clarity. Accordingly, one of ordinary skill would understand the scope of the disclosure is not limited by the above explicitly described embodiments but by the claims and equivalents thereof.

What is claimed is:

1. An apparatus configured to prevent at least one vulnerable road user (VRU) from having an accident, the apparatus comprising:
    a driver monitoring unit configured to utilize at least one sensor provided in a vehicle to detect a gaze area corresponding to a gaze direction of a driver of the vehicle and a head pose corresponding to a direction in which the driver's face is directed by calculating various distance differences based on a plurality of landmark points detected from the driver's face image;
    a VRU monitoring unit configured to calculate position information including current position and predicted motion information of the VRU existing in a peripheral area of the vehicle, the VRU is detected by using the at least one sensor;
    a detection unit configured to detect whether the driver is aware of the VRU and whether the VRU is aware of the driver based on a gaze area of the driver, the position information and heading information of the VRU, wherein the heading information is predicted by a future position of the VRU and an expected time to reach the future position;
    a warning processing unit configured to output warning information on a dangerous situation to some or all of the driver and the VRU in response to a detection result of the detection unit;
    a vehicle monitoring unit configured to predict a future movement of the vehicle based on a vehicle movement and a driver control input detected by using the sensor; and
    a collision risk prediction unit configured to determine whether a collision risk is present between the vehicle and the VRU based on the future position calculated by using the VRU monitoring unit and the future movement of the vehicle predicted by using the vehicle monitoring unit.

2. The apparatus of claim 1, wherein the driver monitoring unit is configured to:
    determine, from a driver's image provided by using the sensor, an eye region and a head pose corresponding to a direction in which the driver faces, and
    detect the gaze area by calculating, based on the eye region and the head pose, a position vector extending from a driver's seat of the vehicle to a position at which the driver is looking.

3. The apparatus of claim 1, wherein the VRU monitoring unit is configured to:
    calculate a position vector of a current position of the VRU; and estimate the predicted motion information including whether there is a movement of the VRU, estimated movement information, and estimated standstill information.

4. The apparatus of claim 3, wherein the VRU monitoring unit is configured to calculate a position vector of the future position and the expected time.

5. The apparatus of claim 4, wherein the detection unit is configured to detect whether the VRU is aware of the vehicle based on the VRU heading information predicted based on the future position and the expected time.

6. The apparatus of claim 1, wherein the detection unit is configured to detect whether the driver is aware of the VRU by associating the gaze area provided by the driver monitoring unit with the current position of the VRU calculated by the VRU monitoring unit.

7. The apparatus of claim 1, wherein the warning processing unit is configured to output the warning information in response to the detection result of the detection unit determining that the driver does not pay attention to the VRU while the VRU does not pay attention to the driver.

8. The apparatus of claim 1, wherein the warning processing unit is configured to output the warning information by taking account of a prediction of the collision risk prediction unit determining that there exists the VRU at risk of collision with the vehicle, the driver does not pay attention to the VRU, and the VRU does not pay attention to the vehicle.

9. The apparatus of claim 1, further comprising a vehicle control unit configured to control to change a movement of the vehicle to reduce a collision risk between the driver and the VRU.

10. The apparatus of claim 1, wherein the apparatus is configured for use with vehicles having relatively quiet motors.

11. The apparatus of claim 2, wherein the driver's image is based on a position of the driver's pupil.

12. The apparatus of claim 1, wherein the detection unit and collision risk prediction unit are arranged in parallel.

13. A method of preventing at least on vulnerable road user (VRU) from having an accident, the method comprising:
utilizing at least one sensor provided in a vehicle to detect a gaze area corresponding to a gaze direction of a driver of the vehicle and a head pose corresponding to a direction in which the driver's face is directed by calculating various distance differences based on a plurality of landmark points detected from the driver's face image;
calculating position information including current position and predicted motion information of the VRU existing in a peripheral area of the vehicle, the VRU is detected by using the sensor;
detecting whether the driver is aware of the VRU and whether the VRU is aware of the driver based on a gaze area of the driver, the position information, and heading information of the VRU, wherein the heading information is predicted by a future position of the VRU and an expected time to reach the future position;
outputting warning information on a dangerous situation to some or all of the driver and the VRU in response to a detection result of the detecting;
predicting a future movement of the vehicle based on a vehicle movement and a driver control input detected by using the sensor; and
determining whether a collision risk is present between the vehicle and the VRU based on a future position of the VRU calculated by the calculating of the position information and the future movement of the vehicle predicted by the predicting.

14. The method of claim 13, wherein the outputting comprises:
outputting the warning information in response to the detection result of the detecting determining that the driver does not pay attention to the VRU while the VRU does not pay attention to the driver.

15. The method of claim 13, wherein the outputting comprises outputting the warning information by taking account of whether the collision risk is present.

16. The method of claim 13, further comprising:
determining from a driver's image provided by using the sensor, an eye region and a head pose corresponding to a direction in which the driver faces; and
detecting the gaze area by calculating, based on the eye region and the head pose, a position vector extending from a driver's seat of the vehicle to a position at which the driver is looking.

17. The method of claim 16, further comprising:
calculating a position vector of a current position of the VRU; and
estimating the predicted motion information including whether there is a movement of the VRU, estimated movement information, and estimated standstill information.

18. The method of claim 17, further comprising calculating a position vector of the future position and the expected time.

19. The method of claim 18, further comprising detecting whether the VRU is aware of the vehicle based on the VRU heading information predicted based on the future position and the expected time.

20. The apparatus of claim 1, wherein the plurality of landmarks include a nose landmark and a chin landmark.

* * * * *